United States Patent
Wang (10) Patent No.: US 12,489,802 B2
(45) Date of Patent: Dec. 2, 2025

(54) MEDIA STREAMING METHOD AND SYSTEM

(71) Applicant: SHANGHAI BILIBILI TECHNOLOGY CO., LTD., Shanghai (CN)

(72) Inventor: Sheng Wang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 55 days.

(21) Appl. No.: 18/716,897

(22) PCT Filed: Jun. 14, 2022

(86) PCT No.: PCT/CN2022/098682
§ 371 (c)(1),
(2) Date: Jun. 5, 2024

(87) PCT Pub. No.: WO2023/103318
PCT Pub. Date: Jun. 15, 2023

(65) Prior Publication Data
US 2025/0047733 A1    Feb. 6, 2025

(30) Foreign Application Priority Data

Dec. 6, 2021    (CN) .......................... 202111480536.4

(51) Int. Cl.
*H04L 65/65*    (2022.01)

(52) U.S. Cl.
CPC .................................. *H04L 65/65* (2022.05)

(58) Field of Classification Search
CPC ...................................................... H04L 65/65
See application file for complete search history.

(56) References Cited

U.S. PATENT DOCUMENTS

| 8,990,408 B1* | 3/2015 | Owen ................ H04L 65/1059 709/227 |
| 11,374,998 B1* | 6/2022 | Halepovic ............... H04L 65/75 |

(Continued)

FOREIGN PATENT DOCUMENTS

| CN | 109996097 A | 7/2019 |
| CN | 111080637 A | 4/2020 |

(Continued)

OTHER PUBLICATIONS

International Patent Application No. PCT/CN2022/098682; Int'l Written Opinion and Search Report; dated Aug. 31, 2022; 9 pages.

*Primary Examiner* — Nazia Naoreen
(74) *Attorney, Agent, or Firm* — BakerHostetler (57) ABSTRACT

The present application provides a media streaming method. The method is applied to user equipment, and includes: obtaining a uniform resource identifier for accessing an RTMP server; determining whether the uniform resource identifier carries a QUIC identifier; establishing a QUIC connection with the RTMP server based on a QUIC transport protocol in response to determining that the uniform resource identifier carries the QUIC identifier, and establishing a target RTMP connection that is based on the QUIC connection. In the present application, the QUIC connection and the target RTMP connection that is based on the QUIC connection are established based on the uniform resource identifier carrying the QUIC identifier. In this way, an RTMP packet is encapsulated into a QUIC packet, and data is transmitted through the QUIC connection. Therefore, real-time performance of transmission is improved.

17 Claims, 8 Drawing Sheets

(56) References Cited

U.S. PATENT DOCUMENTS

2018/0294972 A1 10/2018 Fielder
2020/0120555 A1 4/2020 Patil et al.

FOREIGN PATENT DOCUMENTS

| CN | 111294399 | A | 6/2020 | |
|----|-----------|---|--------|---|
| CN | 111567011 | A | 8/2020 | |
| CN | 111756674 | A | 10/2020 | |
| CN | 112039824 | A | 12/2020 | |
| CN | 113271316 | A | 8/2021 | |
| CN | 114157607 | A | 3/2022 | |
| WO | WO-2019147157 A1 * | | 8/2019 | ........... H04L 65/612 |
| WO | WO 2019/243890 A2 | | 12/2019 | |

* cited by examiner

MEDIA STREAMING METHOD AND SYSTEM

CROSS-REFERENCE TO RELATED APPLICATIONS

The present application is the U.S. National Stage of International Application No. PCT/CN2022/098682, filed on Jun. 14, 2022, which claims priority to Chinese Patent Application No. 202111480536.4, filed on Dec. 6, 2021, and entitled "VIDEO PREVIEW METHOD AND APPARATUS", which are incorporated herein by reference in their entireties.

TECHNICAL FIELD

The present application relates to the field of communication technologies, and in particular, to a media streaming method and apparatus, a device, a computer-readable storage medium, and a media streaming system.

BACKGROUND ART

With the development of a computer technology and live video streaming, various live streaming APPs emerge one after another, to meet different user requirements. In a live streaming scenario, a low latency is one of indicators of user experience. A latency is greatly affected by a transport protocol selected in a live streaming architecture. Currently, common protocols include a real-time messaging protocol (RTMP), HTTP live streaming (HLS), and HTTP-FLV. However, the inventor has realized that real-time performance of transmission based on these protocols cannot meet a high user requirement.

SUMMARY OF THE INVENTION

An objective of embodiments of the present application is to provide a media streaming method and apparatus, a computer device, a computer-readable storage medium, and a media streaming system, to solve the above defect.

An aspect of the embodiments of the present application provides a media streaming method. The method is applied to user equipment, and includes:
  obtaining a uniform resource identifier for accessing an RTMP server;
  determining whether the uniform resource identifier carries a QUIC identifier; and
  establishing, to the RTMP server in response to the uniform resource identifier carrying the QUIC identifier, a QUIC connection that is based on a QUIC transport protocol, and
  establishing a target RTMP connection that is based on the QUIC connection.

Optionally, the QUIC identifier is represented by a URI scheme in the uniform resource identifier.

The URI scheme includes "RTMP" and one or more QUIC identification characters after the "RTMP".

Optionally, the QUIC identifier is a preset string, and the preset string is in a query string parameter of the uniform resource identifier.

Optionally, the method further includes:
  establishing, to the RTMP server in response to the uniform resource identifier not carrying the QUIC identifier, a TCP connection that is based on a TCP transport protocol, and
  establishing another RTMP connection that is based on the TCP connection.

Optionally, the method further includes:
  converting, when the RTMP server does not support establishment of the QUIC connection or the target RTMP connection, the uniform resource identifier carrying the QUIC identifier into a uniform resource identifier satisfying a preset format; and
  establishing a connection between the user equipment and the RTMP server in response to the converted uniform resource identifier.

Optionally, the method further includes:
  preconfiguring a QUIC protocol stack and an RTMPQ protocol stack that is based on the QUIC protocol stack.

The QUIC protocol stack is used for parsing a received QUIC packet to obtain an RTMP packet, and providing the RTMP packet obtained through parsing for the RTMPQ protocol stack.

The RTMPQ protocol stack is used for parsing the RTMP packet provided by the QUIC protocol stack, to obtain RTMP data to be played.

Optionally, the RTMPQ protocol stack is further used for encapsulating RTMP data to be sent into an RTMP packet, and providing the encapsulated RTMP packet for the QUIC protocol stack.

The QUIC protocol stack is further used for encapsulating the RTMP packet provided by the RTMPQ protocol stack into a QUIC packet to be sent.

Yet another aspect of the embodiments of the present application provides a media streaming apparatus. The apparatus is used in user equipment, and includes: an obtaining module configured to obtain a uniform resource identifier for accessing an RTMP server;
  a determining module configured to determine whether the uniform resource identifier carries a QUIC identifier; and
  a connection module configured to establish, to the RTMP server in response to the uniform resource identifier carrying the QUIC identifier, a QUIC connection that is based on a QUIC transport protocol, and establish a target RTMP connection that is based on the QUIC connection.

Yet another aspect of the embodiments of the present application provides a media streaming method. The method is applied to a server, and includes:
  establishing, to user equipment in response to a QUIC connection request provided by the user equipment, a QUIC connection that is based on a QUIC transport protocol; and
  establishing, to the user equipment in response to an RTMP connection request transmitted by the user equipment based on the QUIC connection, a target RTMP connection that is based on the QUIC connection.

Optionally, the method further includes:
  preconfiguring a QUIC protocol stack and an RTMPQ protocol stack that is based on the QUIC protocol stack.

The RTMPQ protocol stack is further used for encapsulating RTMP data to be sent into an RTMP packet, and providing the encapsulated RTMP packet for the QUIC protocol stack.

The QUIC protocol stack is further used for encapsulating the RTMP packet provided by the RTMPQ protocol stack into a QUIC packet to be sent.

Optionally, the QUIC protocol stack is used for parsing a received QUIC packet to obtain an RTMP packet, and providing the RTMP packet obtained through parsing for the RTMPQ protocol stack.

The RTMPQ protocol stack is used for parsing the RTMP packet provided by the QUIC protocol stack, to obtain RTMP data to be pushed.

Yet another aspect of the embodiments of the present application provides a media streaming apparatus. The apparatus is used in a server, and includes:

a first establishment module configured to establish, to user equipment in response to a QUIC connection request provided by the user equipment, a QUIC connection that is based on a QUIC transport protocol; and a second establishment module configured to establish, to the user equipment in response to an RTMP connection request transmitted by the user equipment based on the QUIC connection, a target RTMP connection that is based on the QUIC connection.

Yet another aspect of the embodiments of the present application provides a computer device, including a memory, a processor, and computer-readable instructions stored on the memory and capable of running on the processor. When the processor executes the computer-readable instructions, the steps of any of the foregoing media streaming methods are implemented.

Still another aspect of the embodiments of the present application provides a computer-readable storage medium having computer-readable instructions stored thereon. The computer-readable instructions may be executed by at least one processor to cause the at least one processor to perform the steps of any of the foregoing media streaming methods.

Yet another aspect of the embodiments of the present application provides a media streaming system, including user equipment and a server.

The user equipment is configured to initiate a QUIC connection request to the server when a uniform resource identifier carries a QUIC identifier.

The server is configured to establish, to the user equipment in response to the QUIC connection request, a QUIC connection that is based on a QUIC transport protocol.

The user equipment is configured to send an RTMP connection request based on the QUIC connection in response to successful establishment of the QUIC connection.

The server is configured to receive the RTMP connection request based on the QUIC connection, and establish, to the user equipment in response to the RTMP connection request, a target RTMP connection that is based on the QUIC connection.

Optionally, the QUIC identifier is represented by a URI scheme in the uniform resource identifier.

The URI scheme includes "RTMP" and one or more QUIC identification characters after the "RTMP".

Optionally, the QUIC identifier is a preset string, and the preset string is in a query string parameter of the uniform resource identifier.

Optionally, the user equipment is further configured to establish, to the server in response to the uniform resource identifier not carrying the QUIC identifier, a TCP connection that is based on a TCP transport protocol, and establish another RTMP connection that is based on the TCP connection.

Optionally, the user equipment is further configured to: convert, when the server does not support establishment of the QUIC connection or the target RTMP connection, the uniform resource identifier carrying the QUIC identifier into a uniform resource identifier satisfying a preset format; and establish a connection between the user equipment and the server in response to the converted uniform resource identifier.

Optionally, the user equipment is further configured with a blacklist, and the blacklist is used for recording a server domain name capable of establishing an RTMP connection that is based on the QUIC transport protocol.

The media streaming method and apparatus, the device, the computer-readable storage medium, and the media streaming system provided in the embodiments of the present application may have the following advantages. The QUIC connection and the RTMP connection that is based on the QUIC connection may be established between the user equipment and the server based on the uniform resource identifier carrying the QUIC identifier. In this way, an RTMP packet is encapsulated into a QUIC packet, and data is transmitted through the QUIC connection. Therefore, real-time performance of transmission is improved (particularly when the QUIC connection is previously established between the user equipment and the server).

DETAILED DESCRIPTION OF EMBODIMENTS

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely for the illustrative purpose, and should not be construed as indicating or implying the relative importance thereof or implicitly indicating the number of technical features indicated. Therefore, a feature defined by "first" or "second" may explicitly or implicitly include at least one such feature. In addition, technical solutions in various embodiments may be combined with each other, provided that they can be implemented by those of ordinary skill in the art. When a combination of the technical solutions incurs conflict or cannot be implemented, it should be considered that such a combination of the technical solutions does not exist, and does not fall within the claimed scope of protection of the present application either.

In the description of the present application, it should be understood that the reference numerals of steps do not indicate the order of execution of the steps, but are merely to facilitate the description of the present application and differentiation between the steps, and thus will not be interpreted as limiting the present application.

The inventor realizes that, in a streaming media playing scenario, it is increasingly difficult to meet actual requirements for security, a low latency (for example, real-time performance), network connectivity, mobility, and other aspects by using an existing live streaming protocol, for example, RTMP, HTTP live streaming (HLS), or HTTP-FLV.

For the foregoing problem, the present application provides a new network transport protocol based on RTMP. With this new network transport protocol, high security, a low latency (for example, real-time performance), network connectivity, and mobility can be ensured.

Terms in the present application are explained below.

Real-time messaging protocol (RTMP): it is an open protocol developed to transmit streaming audio, video, and data between a flash player and a server through the Internet. It is a plaintext protocol working based on a TCP, and uses the port 1935 by default. In the protocol, a basic data unit is a message. The message may be divided into smaller message chunk units in a transmission process. Finally, message chunks obtained through division are transmitted through the TCP, and a receive end recovers streaming media data from the received message chunks after decoding.

Quick UDP Internet connections (QUIC): it was originally designed by Jim Roskind at Google, implemented and deployed in 2012, and released in public and described to the Internet engineering task force (IETF) in 2013 with expansion of the scope of experiments. QUIC (referred to as a QUIC transport protocol hereinafter) is a UDP-based low-latency Internet transport layer protocol with many advantages such as reducing a connection latency, avoiding head-of-line blocking, and multiplexing.

Protocol stack: it is also referred to as a protocol stack, and is a specific software implementation of a computer network protocol suite.

Uniform resource identifier (URI): it is used for identifying a string of a specific Internet resource name. Such an identifier allows a user to perform an interactive operation on a resource in a network by using a specific protocol. The URI includes a uniform resource locator (URL) for specifying a website address.

Figure 1:
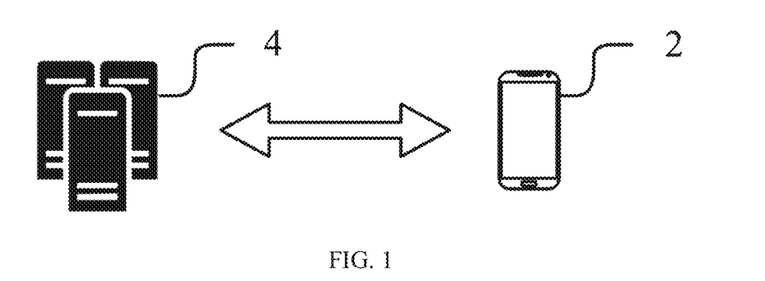
FIG. 1 is an architecture diagram schematically showing a media streaming system according to Embodiment 1 of the present application.

FIG. 1 is an architecture diagram schematically showing a media streaming system according to an embodiment of the present application.

A server 4 may establish a network connection to user equipment (for example, user equipment 2) through a network.

The server 4 may provide a content service for the user equipment 2. The content service may be configured to provide content such as video, audio, text data, or a combination thereof. The content may include content streams (for example, video streams, audio streams, and information streams), content files (for example, video files, audio files, and text files), and/or other data. The server 4 may also accept a pushed stream of the user equipment 2, and forward obtained pushed stream data to another device.

The server 2 may include one or more computer devices, for example, a rack server, a blade server, a tower server, or a cabinet server (including an independent server or a server cluster that includes a plurality of servers). The one or more computer devices may include a virtualized computing instance. The computer device may be configured to load a virtual machine based on a virtual image and/or other data of specific software (for example, an operating system, a dedicated application program, or a server) defined for simulation. As requirements on different types of processing services change, different virtual machines may be loaded and/or terminated on the one or more computer devices.

The network may include various network devices, for example, routers, switches, multiplexers, hubs, modems, network bridges, repeaters, firewalls, and/or proxy devices. The network may include physical links, for example, coaxial cable links, twisted-pair cable links, optical fiber links, and/or a combination thereof. The network may include a wireless link, for example, a cellular link, a satellite link, and/or a Wi-Fi link.

The user equipment 2 may be configured to access the server 4. The user equipment 2 may include any type of computer device, for example, a smartphone, a tablet computer, a smart television, a projector, and a personal computer. The user equipment 2 may have a built-in browser or dedicated program, and through the browser or the dedicated program, receive a media stream and output content to the user. The content may include a video stream, an audio stream, an information stream, a comment, or other data. When the user equipment 2 is a streamer side, the user equipment may also provide the media stream for the server 4, for the server 4 to forward.

The user equipment 2 may include an interface. The interface may include an input element. For example, the input element may be configured to receive a user instruction. The user instruction may cause the user equipment 2 to perform various types of operations, for example, accessing the server 4.

The amount of user equipment and the number of servers (RTMP servers) in FIG. 1 are merely exemplary, and are not intended to limit the present application. Based on the architecture shown in FIG. 1, a media streaming solution is described below by using a plurality of embodiments.

Embodiment 1

Continue to refer to FIG. 1. This embodiment of the present application provides a media streaming system.

As shown in FIG. 1, the media streaming system may include the server 4 and the user equipment 2.

The user equipment 2 is configured to initiate a QUIC connection request to the server when a uniform resource identifier carries a QUIC identifier.

The server 4 is configured to establish, to the user equipment in response to the QUIC connection request, a QUIC connection that is based on a QUIC transport protocol.

The user equipment 2 is configured to send an RTMP connection request based on the QUIC connection in response to successful establishment of the QUIC connection.

The server 4 is configured to receive the RTMP connection request based on the QUIC connection, and establish, to the user equipment in response to the RTMP connection request, a target RTMP connection that is based on the QUIC connection.

Figure 2:
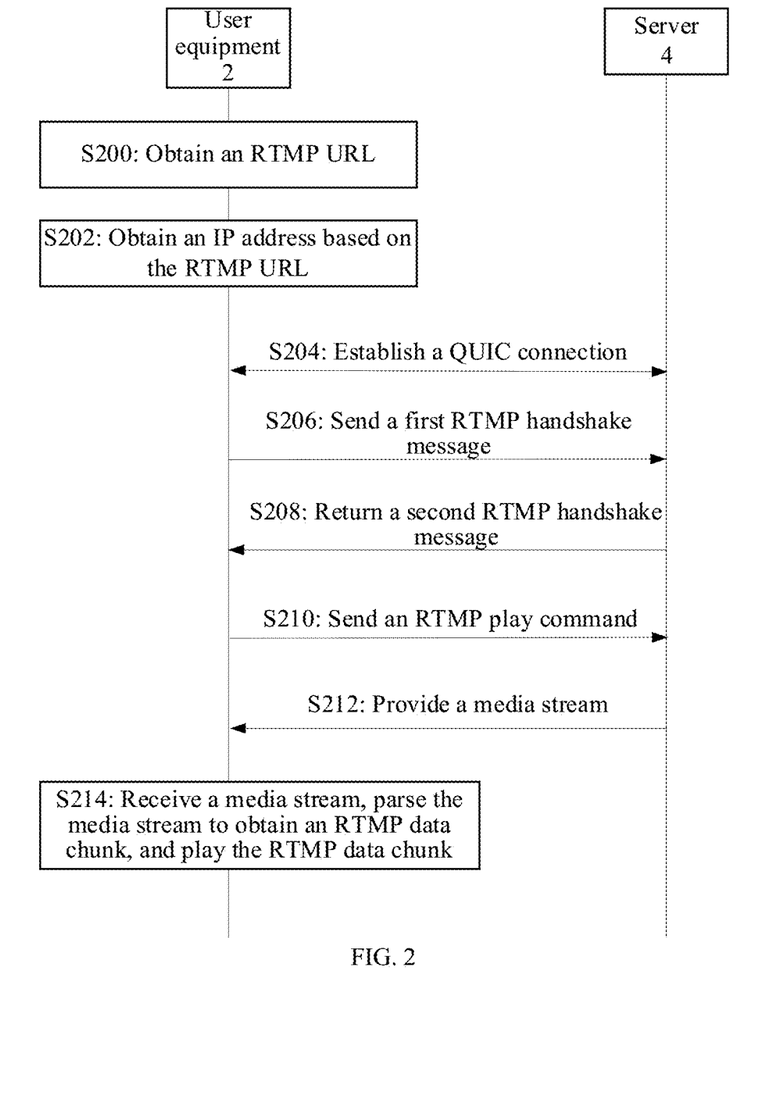
FIG. 2 is a diagram schematically showing a working process of the media streaming system according to Embodiment 1 of the present application.
Figure 3:
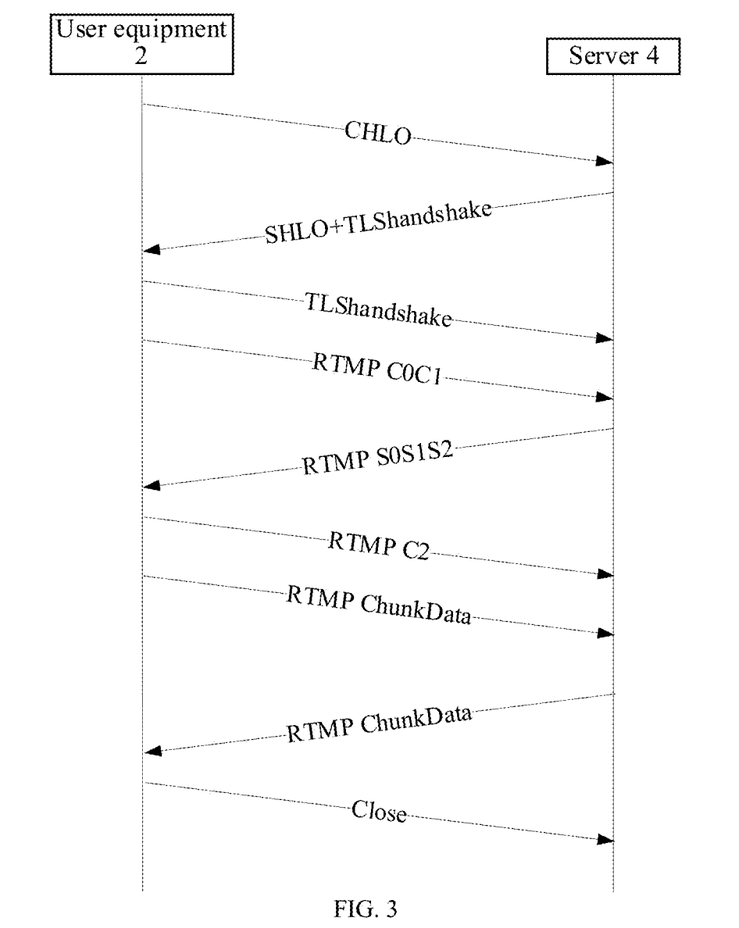
FIG. 3 is a diagram schematically showing a data flow direction of the media streaming system according to Embodiment 1 of the present application.

As shown in FIG. 2 and FIG. 3, a working process of the media streaming system is described below by using a specific application example.

In step S200, the user equipment 2 obtains an RTMP URL of the server 4.

The user equipment 2 is configured with a browser or a dedicated program (a player or a streamer client program). The browser or the dedicated program provides a user interface for the user to input the RTMP URL, or generates the RTMP URL in response to a user input.

For example, the RTMP URL is rtmpq://live-push.bilivideo.com/live-bvc/?streamname=live123456789.

For another example, the RTMP URL is rtmp://live-push.bilivideo.com/live-bvc/?streamname=live123456789.

The foregoing exemplary RTMP URLs may be used for pointing to a data stream numbered "123456789" in the server.

In step S202, the user equipment 2 sends the RTMP URL to a DNS for parsing, to obtain an IP address.

For example, the DNS parses a domain name "live-push.bilivideo.com" to obtain "11.22.33.44". DNS parsing is a recursive query process. The IP address is first queried in a local domain name server. If the IP address is not found, the local domain name server may send a request to a root domain name server. If the root domain name server does not store the domain name either, the local domain name server may send a request to a com top-level domain name server. By analogy, the IP address is finally obtained is obtained from the local domain name server and locally cached, for next query and use.

In step S204, when the RTMP URL carries the QUIC identifier, the user equipment 2 initiates a QUIC connection request to the server 4 to establish, between the user equipment 2 and the server 4, a QUIC connection that is based on a QUIC transport protocol.

An IP address of the QUIC connection request is "11.22.33.44", and a port number is "1935".

"1935" is a default port number of the RTMP. If another port number is previously negotiated, the port number is the negotiated port number.

Herein, refer to FIG. 3. If the user equipment 2 establishes the QUIC connection to the server 4 for the first time, an establishment process may be as follows.

In step 1, the user equipment 2 generates a QUIC CHLO (inchoate Client Hello) message, and sends the QUIC CHLO message to the server 4.

In step 2, the server 4 returns an SHLO (Server Hello) message and a TLS handshake message in response to the CHLO message.

The TLS handshake message may also be referred to as a TLShandshake message.

In step 3, the user equipment 2 returns another TLS handshake message in response to the SHLO message and the TLS handshake message.

The QUIC connection is established quickly in step 1 to step 3. Therefore, a network latency is reduced effectively.

Based on a related specification of the QUIC transport protocol, when the user equipment 2 establishes the QUIC connection to the server 4 not for the first time, the QUIC connection may be re-established with 0 round-trip time (0-RTT).

Continue to refer to FIG. 2 and FIG. 3. When the QUIC connection is successfully established, step S206 is performed.

In step S206, the user equipment 2 sends a first RTMP handshake message (RTMP C0C1 packet) based on the QUIC connection.

Specifically, the first RTMP handshake message is encapsulated into a first QUIC packet, and the first QUIC packet is sent to the server 4.

In step S208, the server 4 returns a second RTMP handshake message (RTMP S0S1S3 packet) based on the QUIC connection in response to the first RTMP handshake message.

Specifically, the second RTMP handshake message is encapsulated into a second QUIC packet, and the second QUIC packet is sent to the user equipment 2.

If the user equipment 2 receives the second RTMP handshake message, it indicates that the target RTMP connection that is based on the QUIC connection is successfully established.

Continue to refer to FIG. 2 and FIG. 3. When the target RTMP connection that is based on the QUIC connection is successfully established, a media stream may be transmitted between the user equipment 2 and the server 4. Exemplarily, reference is made to step S210 to step S214.

In step S210, the user equipment 2 sends an RTMP play command to the server 4 through the target RTMP connection that is based on the QUIC connection.

The RTMP play command, that is, an RTMP play command, is used for instructing the server 4 to provide the media stream.

In step S212, the server 4 provides, in response to the RTMP play command, the media stream through the target RTMP connection that is based on the QUIC connection.

In step S214, the user equipment 2 receives the media stream, parses the media stream to obtain an RTMP data chunk (Chunkdata), and plays the RTMP data chunk.

Figure 4:
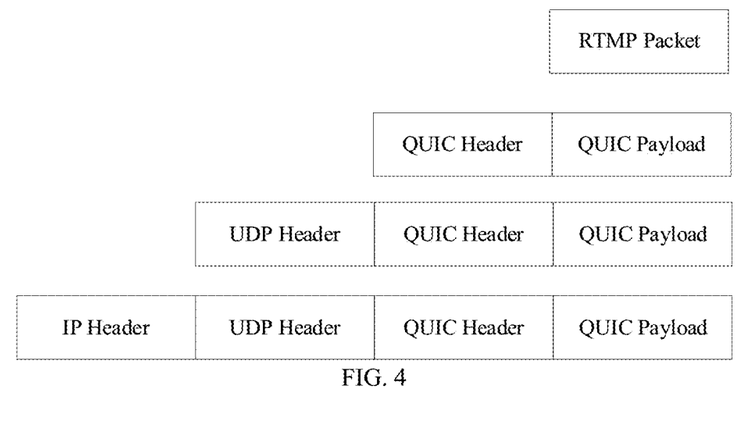
FIG. 4 schematically shows data encapsulation of the media streaming system according to Embodiment 1 of the present application.

As shown in FIG. 4, in step S212, a sending process of the server 4 is as follows.

In (1), the server 4 performs encapsulation to obtain an RTMP packet (which may include signaling, media data, and the like).

In (2), the server 4 encapsulates the RTMP packet into a QUIC packet, and sends the QUIC packet through the QUIC connection.

In step S214, a receiving process of the user equipment 2 is as follows.

In (1), the user equipment 2 receives the QUIC packet from the server 4 through the QUIC connection.

In (2), the user equipment 2 parses the QUIC packet to obtain the RTMP packet, and finally plays the RTMP packet obtained through parsing.

It should be noted that, based on an open system interconnection reference model (OSI), a QUIC layer is above a UDP layer. Details about encapsulation of a lower protocol layer are not described herein.

The above describes only pulling of the media stream by the user equipment 2 from the server 4. It should be noted that the target RTMP connection may also be used for provision of a media stream by the user equipment 2 for the server 4, a back-to-origin link of a CDN system, or the like.

According to the media streaming system described above, the QUIC connection and the target RTMP connection that is based on the QUIC connection may be established based on the uniform resource identifier carrying the QUIC identifier. In this way, an RTMP packet is encapsulated into a QUIC packet, and data is transmitted through the QUIC connection. In this embodiment, a network latency when the user equipment first accesses the RTMP server can be reduced, so that real-time performance of transmission is improved (particularly when the QUIC connection is previously established between the user equipment and the server). In addition, an RTMP data stream is transmitted through the target RTMP connection that is based on the QUIC connection, so that security of the QUIC connection, network connectivity, and QUIC-ConnectionID-based seamless mobility are ensured, and a high user requirement is effectively met.

Several optional embodiments are provided below.

As an optional embodiment, for ease of input and recognition:

the QUIC identifier is represented by a URI scheme in the uniform resource identifier.

The URI scheme includes "RTMP" and one or more QUIC identification characters after the "RTMP".

For example, "RTMPQ" is used as both the URI scheme and the QUIC identifier.

"rtmpq://live-push.bilivideo.com/live-bvc/?streamname=live123456789" is used as an example. When the user equipment 2 parses the URI, and the URI scheme obtained through parsing is "RTMPQ", it indicates that the QUIC identifier is carried. It should be noted that the URI scheme is not limited to "RTMPQ", and may alternatively be "RTMPQUIC".

As an optional embodiment:

the QUIC identifier is a preset string, and the preset string is in a query string parameter of the uniform resource identifier.

For example, if a URI in the following format is provided for the user equipment 2: rtmp://hostname [: port]/path/[; parameters] [?query] #fragment, and a preset string for representing that the QUIC transport protocol is supported, for example, "isquic", is set in query, it indicates that the URI carries the QUIC identifier.

As an optional embodiment, to ensure transmission of the media stream, the user equipment 2 is further configured to:

establish, to the server in response to the uniform resource identifier not carrying the QUIC identifier, a TCP connection that is based on a TCP transport protocol, and establish another RTMP connection that is based on the TCP connection.

Figure 5:
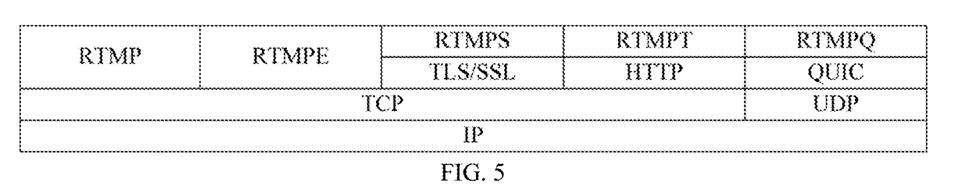
FIG. 5 is a diagram schematically showing a transport protocol framework of the media streaming system according to Embodiment 1 of the present application.

As shown in FIG. 5, an RTMP series includes other variant protocols such as an RTMPE protocol, an RTMPS protocol, and an RTMPT protocol, in addition to a QUIC-protocol-based RTMP protocol (referred to as an RTMPQ protocol hereinafter) provided in this embodiment.

If the uniform resource identifier does not carry the QUIC identifier, a corresponding RTMP connection that is based on the TCP connection is established.

For example, if the URI is "rtmpe://live-push.bilivideo.com/live-bvc/?streamname=live123456789", an RTMP connection that is based on the RTMPE protocol is established between the user equipment 2 and the server 4.

As an optional embodiment, to ensure transmission of the media stream, the user equipment 2 is further configured to:

convert, when the server does not support establishment of the QUIC connection or the target RTMP connection, the uniform resource identifier carrying the QUIC identifier into a uniform resource identifier satisfying a preset format; and establish a connection between the user equipment and the server in response to the converted uniform resource identifier.

An example of determining that "the server 4 does not support establishment of the QUIC connection or the target RTMP connection" is given below.

In (1), the user equipment 2 sends a QUIC request to the server 4.

In (2), when supporting the QUIC transport protocol, the server 4 may feed back, in response to the QUIC request, a response header or ALTSVC frame that carries a QUIC parameter. QUIC parameters of a plurality of versions are defined in ALTSVC to provide a version negotiation prompt, for example, a version list, of the QUIC transport protocol for the user equipment 2. The version list includes one or more protocol versions of the QUIC transport protocol that are supported by the server 4. When not supporting the QUIC transport protocol, the server 4 may make no response or return a specific message.

In (3), the user equipment 2 determines, based on a response of the server 4, whether the QUIC connection can be established between the user equipment 2 and the server 4.

For example, whether there is a QUIC version supported by both the user equipment 2 and the server 4 is determined, and if there is no QUIC version supported by both the user equipment 2 and the server 4, the QUIC connection cannot be established. For another example, if the server 4 makes no response or responds with a specific message, the QUIC connection cannot be established.

When the QUIC connection has been established between the user equipment 2 and the server 4, the user equipment 2 sends the RTMP C0C1 packet through the QUIC connection. If the server 4 fails to return the "RTMP S0S1S3" packet through the QUIC connection, it indicates that the QUIC connection cannot be established between the user equipment 2 and the server 4.

A blacklist may be configured in the user equipment 2. The blacklist is used for recording a server domain name capable of establishing an RTMP connection that is based on the QUIC transport protocol. Therefore, the user equipment 2 can conveniently determine whether to initiate a request for such a connection.

The connection is established between the user equipment and the server in response to the converted uniform resource identifier. For example, if the URI is rtmpq://127.0.0.1/bvc-live/mystream, "rtmpq://127.0.0.1/bvc-live/mystream" is converted into "rtmp://127.0.0.1/bvc-live/mystream", and an RTMP connection is established to the server 4 through "rtmp://127.0.0.1/bvc-live/mystream". Certainly, "rtmpq://127.0.0.1/bvc-live/mystream" may alternatively be converted into "rtmps://127.0.0.1/bvc-live/mystream" according to a preset rule, and an RTMPS connection is established to the server 4 through "rtmps://127.0.0.1/bvc-live/mystream". The preset rule is that the converted URI is determined based on various RTMP connections supported by the server 4 and an application scenario. The application scenario may be various scenarios such as live streaming, a call, playing, a web page, a native client, or a mini-program.

To ensure the RTMP connection that is based on the QUIC protocol, in this embodiment, a software level is configured as follows.

(1) The user equipment 2 is configured with a QUIC protocol stack and an RTMPQ protocol stack that is based on the QUIC protocol stack.

The QUIC protocol stack is used for parsing a received QUIC packet to obtain an RTMP packet, and providing the RTMP packet obtained through parsing for the RTMPQ protocol stack.

The RTMPQ protocol stack is used for parsing the RTMP packet provided by the QUIC protocol stack, to obtain RTMP data to be played.

The RTMPQ protocol stack is further used for encapsulating RTMP data to be sent into an RTMP packet, and providing the encapsulated RTMP packet for the QUIC protocol stack.

The QUIC protocol stack is further used for encapsulating the RTMP packet provided by the RTMPQ protocol stack into a QUIC packet to be sent.

(2) The server 4 is configured with a QUIC protocol stack and an RTMPQ protocol stack that is based on the QUIC protocol stack.

The RTMPQ protocol stack is further used for encapsulating RTMP data to be sent into an RTMP packet, and providing the encapsulated RTMP packet for the QUIC protocol stack.

The QUIC protocol stack is further used for encapsulating the RTMP packet provided by the RTMPQ protocol stack into a QUIC packet to be sent.

The QUIC protocol stack is used for parsing a received QUIC packet to obtain an RTMP packet, and providing the RTMP packet obtained through parsing for the RTMPQ protocol stack.

The RTMPQ protocol stack is used for parsing the RTMP packet provided by the QUIC protocol stack, to obtain RTMP data to be pushed.

Embodiment 2

A media streaming method provided in this embodiment may be applied to the user equipment 2. For specific technical details, refer to the above.

Figure 6:
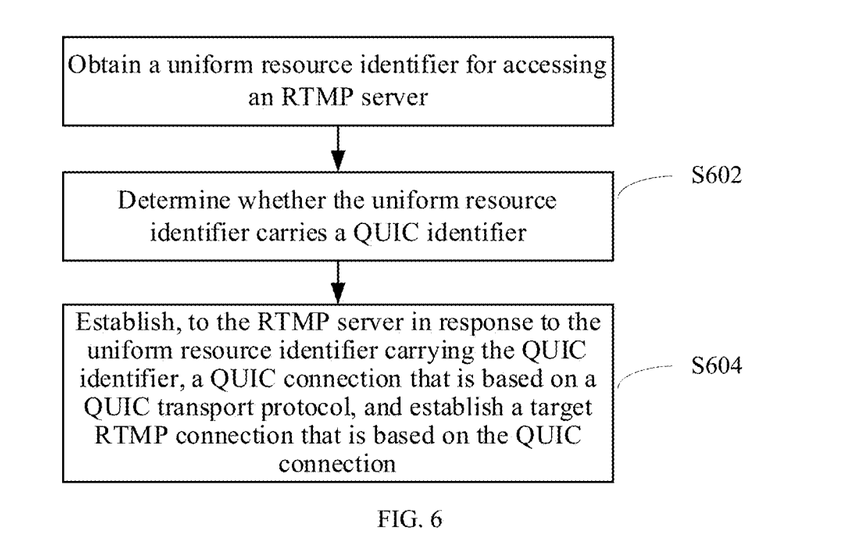
FIG. 6 is a flowchart schematically showing a media streaming method according to Embodiment 2 of the present application.

FIG. 6 is a flowchart schematically showing the media streaming method according to Embodiment 2 of the present application.

As shown in FIG. 6, the media streaming method may include steps S600 to S604.

In step S600, a uniform resource identifier for accessing an RTMP server (the server 4) is obtained.

In step S602, whether the uniform resource identifier carries a QUIC identifier is determined.

In step S604, a QUIC connection that is based on a QUIC transport protocol is established to the RTMP server in response to the uniform resource identifier carrying the QUIC identifier, and a target RTMP connection that is based on the QUIC connection is established.

The media streaming method provided in this embodiment has the following advantages.

The QUIC connection and the target RTMP connection that is based on the QUIC connection may be established based on the uniform resource identifier carrying the QUIC identifier. In this way, an RTMP packet is encapsulated into a QUIC packet, and data is transmitted through the QUIC connection. In this embodiment, a network latency when the user equipment first accesses the RTMP server can be avoided, so that real-time performance of transmission is improved (particularly when the QUIC connection is previously established between the user equipment and the server). In addition, an RTMP data stream is transmitted through the target RTMP connection that is based on the QUIC connection, so that security of the QUIC connection, network connectivity, and mobility are ensured, and a high user requirement is effectively met.

As an optional embodiment:
the QUIC identifier is represented by a URI scheme in the uniform resource identifier.

The URI scheme includes "RTMP" and one or more QUIC identification characters after the "RTMP".

As an optional embodiment:
the QUIC identifier is a preset string, and the preset string is in a query string parameter of the uniform resource identifier.

Figure 7:
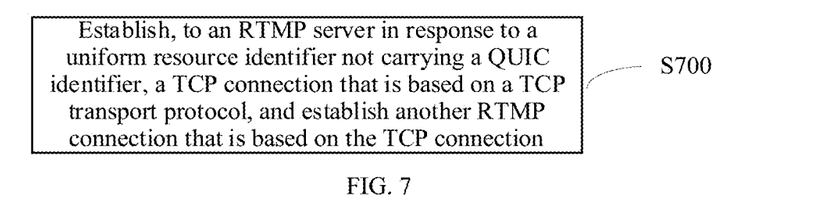
FIG. 7 is a flowchart schematically showing a newly added step of the media streaming method according to Embodiment 2 of the present application.

As an optional embodiment, as shown in FIG. 7, the method further includes the following step.

In step S700, a TCP connection that is based on a TCP transport protocol is established to the RTMP server in response to the uniform resource identifier not carrying the QUIC identifier, and another RTMP connection that is based on the TCP connection is established.

Figure 8:
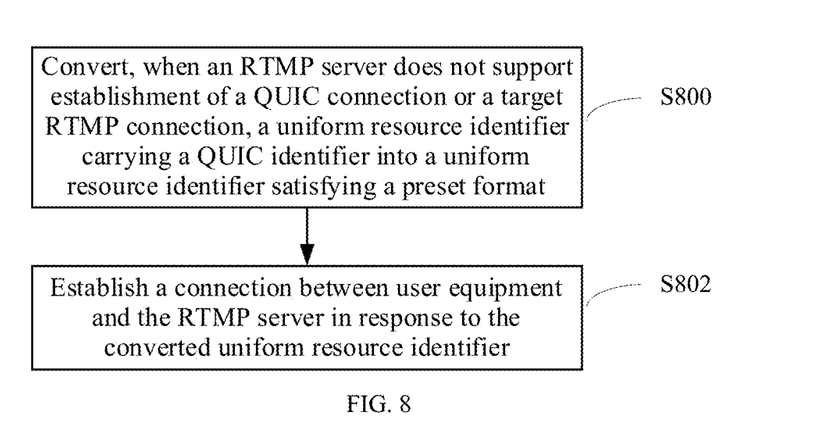
FIG. 8 is another flowchart schematically showing newly added steps of the media streaming method according to Embodiment 2 of the present application.

As an optional embodiment, as shown in FIG. 8, the method further includes the following steps.

In step S800, when the RTMP server does not support establishment of the QUIC connection or the target RTMP connection, the uniform resource identifier carrying the QUIC identifier is converted into a uniform resource identifier satisfying a preset format.

In step S802, a connection between the user equipment and the RTMP server is established in response to the converted uniform resource identifier.

Figure 9:
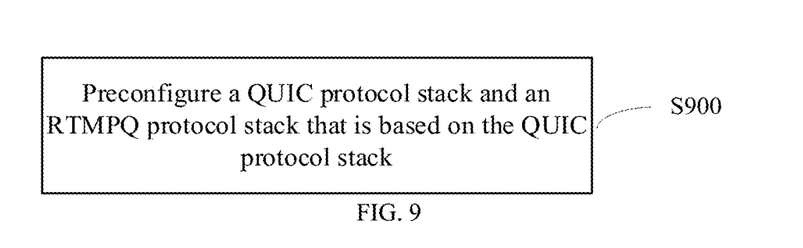
FIG. 9 is another flowchart schematically showing a newly added step of the media streaming method according to Embodiment 2 of the present application.

As an optional embodiment, as shown in FIG. 9, the method further includes the following step.

In step S900, a QUIC protocol stack and an RTMPQ protocol stack that is based on the QUIC protocol stack are preconfigured.

The QUIC protocol stack is used for parsing a received QUIC packet to obtain an RTMP packet, and providing the RTMP packet obtained through parsing for the RTMPQ protocol stack.

The RTMPQ protocol stack is used for parsing the RTMP packet provided by the QUIC protocol stack, to obtain RTMP data to be played.

As an optional embodiment:
the RTMPQ protocol stack is further used for encapsulating RTMP data to be sent into an RTMP packet, and providing the encapsulated RTMP packet for the QUIC protocol stack.

The QUIC protocol stack is further used for encapsulating the RTMP packet provided by the RTMPQ protocol stack into a QUIC packet to be sent.

Embodiment 3

A media streaming method provided in this embodiment may be applied to the server 4. For specific technical details, refer to the above.

Figure 10:
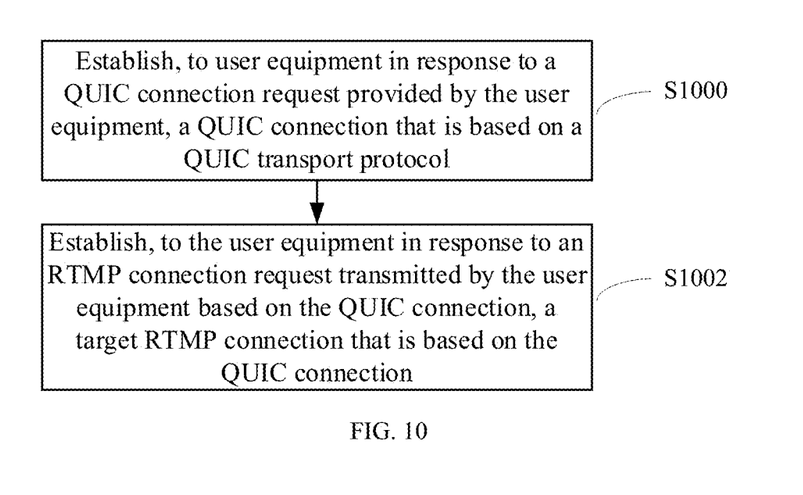
FIG. 10 is a flowchart schematically showing a media streaming method according to Embodiment 3 of the present application.

FIG. 10 is a flowchart schematically showing the media streaming method according to Embodiment 3 of the present application.

The media streaming method may include steps S1000 and S1002.

In step S1000, a QUIC connection that is based on a QUIC transport protocol is established to user equipment in response to a QUIC connection request provided by the user equipment.

In step S1002, a target RTMP connection that is based on the QUIC connection is established to the user equipment in response to an RTMP connection request transmitted by the user equipment based on the QUIC connection.

The media streaming method provided in this embodiment has the following advantages. The QUIC connection and the target RTMP connection that is based on the QUIC connection are established. In this way, an RTMP packet is encapsulated into a QUIC packet, and data is transmitted through the QUIC connection. In this embodiment, a network latency when the user equipment first accesses the RTMP server can be avoided, so that real-time performance of transmission is improved (particularly when the QUIC connection is previously established between the user equipment and the server). In addition, an RTMP data stream is transmitted through the target RTMP connection that is based on the QUIC connection, so that security of the QUIC connection, network connectivity, and mobility are ensured, and a high user requirement is effectively met.

As an optional embodiment, the method further includes:
preconfiguring a QUIC protocol stack and an RTMPQ protocol stack that is based on the QUIC protocol stack.

The RTMPQ protocol stack is further used for encapsulating RTMP data to be sent into an RTMP packet, and providing the encapsulated RTMP packet for the QUIC protocol stack.

The QUIC protocol stack is further used for encapsulating the RTMP packet provided by the RTMPQ protocol stack into a QUIC packet to be sent.

As an optional embodiment:
the QUIC protocol stack is used for parsing a received QUIC packet to obtain an RTMP packet, and providing the RTMP packet obtained through parsing for the RTMPQ protocol stack.

The RTMPQ protocol stack is used for parsing the RTMP packet provided by the QUIC protocol stack, to obtain RTMP data to be pushed.

Embodiment 4

Figure 11:
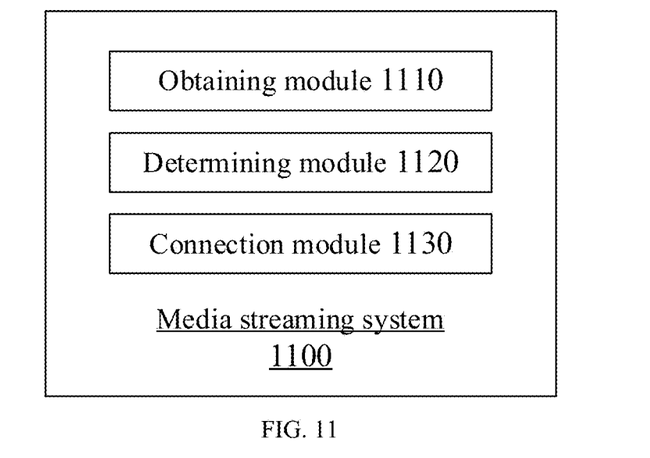
FIG. 11 is a block diagram schematically showing a media streaming apparatus according to Embodiment 4 of the present application.

FIG. 11 is a block diagram schematically showing a media streaming apparatus according to Embodiment 4 of the present application. The media streaming apparatus may be divided into one or more program modules, and the one or more program modules are stored in a storage medium and executed by one or more processors, to implement the embodiments of the present application. The program modules referred to in the embodiments of the present application refer to a series of computer-readable instruction segments capable of implementing a specific function. The functions of various program modules in the embodiments will be specifically described in the following descriptions.

As shown in FIG. 11, the media streaming apparatus 1100 may include an obtaining module 1110, a determining module 1120, and a connection module 1130.

The obtaining module 1110 is configured to obtain a uniform resource identifier for accessing an RTMP server;
the determining module 1120 is configured to determine whether the uniform resource identifier carries a QUIC identifier; and
the connection module 1130 is configured to establish, to the RTMP server in response to the uniform resource identifier carrying the QUIC identifier, a QUIC connection that is based on a QUIC transport protocol, and establish a target RTMP connection that is based on the QUIC connection.

As an optional embodiment:
the QUIC identifier is represented by a URI scheme in the uniform resource identifier.

The URI scheme includes "RTMP" and one or more QUIC identification characters after the "RTMP".

As an optional embodiment:
the QUIC identifier is a preset string, and the preset string is in a query string parameter of the uniform resource identifier.

As an optional embodiment, the connection module 1130 is further configured to:
establish, to the RTMP server in response to the uniform resource identifier not carrying the QUIC identifier, a TCP connection that is based on a TCP transport protocol, and establish another RTMP connection that is based on the TCP connection.

As an optional embodiment, the connection module 1130 is further configured to:
convert, when the RTMP server does not support establishment of the QUIC connection or the target RTMP connection, the uniform resource identifier carrying the QUIC identifier into a uniform resource identifier satisfying a preset format; and
establish a connection between the user equipment and the RTMP server in response to the converted uniform resource identifier.

As an optional embodiment, the apparatus may further include a configuration module (not shown) configured to:
preconfigure a QUIC protocol stack and an RTMPQ protocol stack that is based on the QUIC protocol stack.

The QUIC protocol stack is used for parsing a received QUIC packet to obtain an RTMP packet, and providing the RTMP packet obtained through parsing for the RTMPQ protocol stack.

The RTMPQ protocol stack is used for parsing the RTMP packet provided by the QUIC protocol stack, to obtain RTMP data to be played.

As an optional embodiment:
the RTMPQ protocol stack is further used for encapsulating RTMP data to be sent into an RTMP packet, and providing the encapsulated RTMP packet for the QUIC protocol stack.

The QUIC protocol stack is further used for encapsulating the RTMP packet provided by the RTMPQ protocol stack into a QUIC packet to be sent.

Embodiment 5

Figure 12:
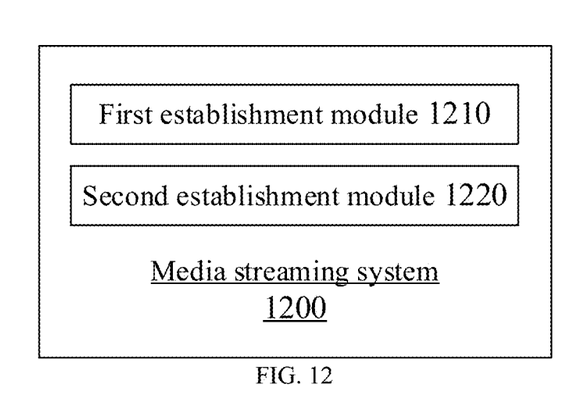
FIG. 12 is a block diagram schematically showing a media streaming apparatus according to Embodiment 5 of the present application.

FIG. 12 is a block diagram schematically showing a media streaming apparatus according to Embodiment 5 of the present application. The media streaming apparatus may be divided into one or more program modules, and the one or more program modules are stored in a storage medium and executed by one or more processors, to implement the embodiments of the present application. The program modules referred to in the embodiments of the present application refer to a series of computer-readable instruction segments capable of implementing a specific function. The functions of various program modules in the embodiments will be specifically described in the following descriptions.

As shown in FIG. 12, the media streaming apparatus 1200 may include a first establishment module 1210 and a second establishment module 1220.

The first establishment module 1210 is configured to establish, to user equipment in response to a QUIC connection request provided by the user equipment, a QUIC connection that is based on a QUIC transport protocol; and the second establishment module 1220 is configured to establish, to the user equipment in response to an RTMP connection request transmitted by the user equipment based on the QUIC connection, a target RTMP connection that is based on the QUIC connection.

As an optional embodiment, the apparatus may further include a configuration module (not shown) configured to:
preconfigure a QUIC protocol stack and an RTMPQ protocol stack that is based on the QUIC protocol stack.

The RTMPQ protocol stack is further used for encapsulating RTMP data to be sent into an RTMP packet, and providing the encapsulated RTMP packet for the QUIC protocol stack.

The QUIC protocol stack is further used for encapsulating the RTMP packet provided by the RTMPQ protocol stack into a QUIC packet to be sent.

As an optional embodiment:
the QUIC protocol stack is used for parsing a received QUIC packet to obtain an RTMP packet, and providing the RTMP packet obtained through parsing for the RTMPQ protocol stack.

The RTMPQ protocol stack is used for parsing the RTMP packet provided by the QUIC protocol stack, to obtain RTMP data to be pushed.

Embodiment 6

Figure 13:
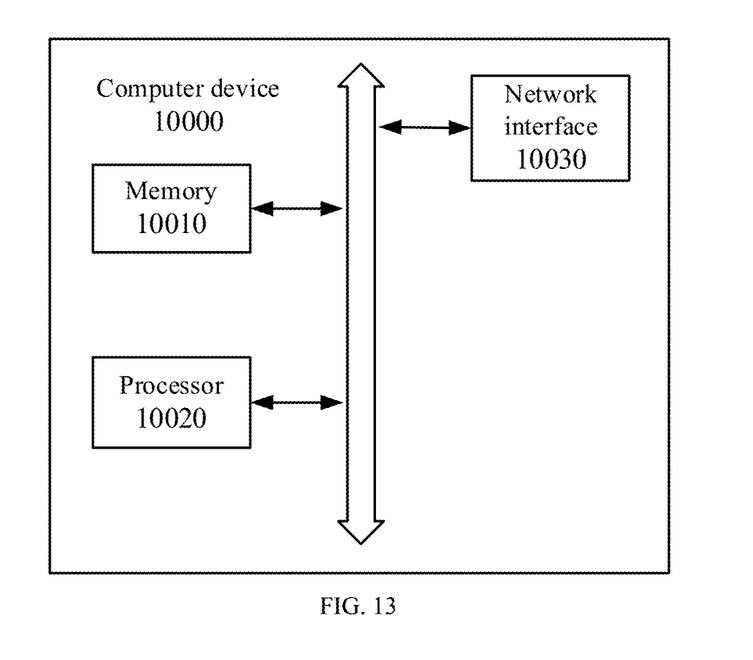
FIG. 13 is a schematic diagram schematically showing a hardware architecture of a computer device suitable for implementing a media streaming method according to Embodiment 6 of the present application.

FIG. 13 is a schematic diagram schematically showing a hardware architecture of a computer device suitable for implementing a media streaming method according to Embodiment 6 of the present application. The computer device 10000 may be used as the server 4 or a component of the server, or may be used as the user equipment 2 or a component of the user equipment. In this embodiment, the computer device 10000 may be a device capable of automatically performing numerical calculation and/or information processing according to preset or prestored instructions. For example, the computer device may be a rack server, a blade server, a tower server, or a cabinet server (including an independent server or a server cluster including a plurality of servers), or may be a smartphone, a tablet computer, a notebook computer, or another electronic apparatus. As shown in FIG. 13, the computer device 10000 includes, but is not limited to a memory 10010, a processor 10020, and a network interface 10030 that may be communicatively linked to each other through a system bus.

The memory 10010 includes at least one type of computer-readable storage medium. The readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EE-PROM), a programmable read-only memory (PROM), a magnetic memory, a magnetic disk, an optical disc, and the like. In some embodiments, the memory 10010 may be an internal storage module of the computer device 10000, for example, a hard disk or an internal memory of the computer device 10000. In some other embodiments, the memory 10010 may alternatively be an external storage device of the computer device 10000, for example, a plug-in hard disk, a smart media card (SMC for short), a secure digital (SD for short) card, or a flash card on the computer device 10000. Certainly, the memory 10010 may alternatively include both an internal storage module and an external storage device of the computer device 10000. In this embodiment, the memory 10010 is generally configured to store an operating system and various types of application software installed on the computer device 10000, such as program code for the media streaming method. In addition, the memory 10010 may be further configured to temporarily store various types of data that have been output or are to be output.

In some embodiments, the processor 10020 may be a central processing unit (CPU for short), a controller, a microcontroller, a microprocessor, or another data processing chip. The processor 10020 is generally configured to control overall operation of the computer device 10000, for example, execute control, processing, and the like related to data interaction or communication with the computer device 10000. In this embodiment, the processor 10020 is configured to run program code stored in the memory 10010 or to process data.

The network interface 10030 may include a wireless network interface or a wired network interface. The network interface 10030 is generally configured to establish a communication link between the computer device 10000 and another computer device. For example, the network interface 10030 is configured to connect the computer device 10000 to an external terminal through a network, and establish a data transmission channel, a communication link, and the like between the computer device 10000 and the external terminal. The network may be a wireless or wired network, for example, Intranet, Internet, the Global System for Mobile Communications (GSM for short), wideband code division multiple access (WCDMA for short), a 4G network, a 5G network, Bluetooth, or Wi-Fi.

It should be noted that FIG. 13 shows only a computer device having components 10010 to 10030. However, it should be understood that not all of the shown components are required to be implemented, and more or fewer components may be implemented instead.

In this embodiment, the media streaming method stored in the memory 10010 may alternatively be divided into one or more program modules and executed by one or more processors (the processor 10020 in this embodiment) to implement the present application.

Embodiment 7

This embodiment further provides a computer-readable storage medium having computer-readable instructions stored thereon. When the computer-readable instructions are executed by a processor, the following steps are implemented:
obtaining a uniform resource identifier for accessing an RTMP server;
determining whether the uniform resource identifier carries a QUIC identifier; and
establishing, to the RTMP server in response to the uniform resource identifier carrying the QUIC identifier, a QUIC connection that is based on a QUIC transport protocol, and establishing a target RTMP connection that is based on the QUIC connection.

Alternatively, when the computer-readable instructions are executed by a processor, the following steps are implemented:

establishing, to user equipment in response to a QUIC connection request provided by the user equipment, a QUIC connection that is based on a QUIC transport protocol; and establishing, to the user equipment in response to an RTMP connection request transmitted by the user equipment based on the QUIC connection, a target RTMP connection that is based on the QUIC connection.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computer device, for example, a hard disk or an internal memory of the computer device. In some other embodiments, the computer-readable storage medium may alternatively be an external storage device of a computer device, for example, a plug-in hard disk, a smart media card (SMC for short), a secure digital (SD for short) card, or a flash card on the computer device. Certainly, the computer-readable storage medium may alternatively include both an internal storage unit and an external storage device of a computer device. In this embodiment, the computer-readable storage medium is generally configured to store an operating system and various types of application software installed on the computer device, for example, program code for the media streaming methods in Embodiment 2 and Embodiment 3. In addition, the computer-readable storage medium may be further configured to temporarily store various types of data that have been output or are to be output.

It is clear to those skilled in the art that the various modules or steps in the above embodiments of the present application may be implemented by a general-purpose computing apparatus, and may be centralized on a single computing apparatus or distributed on a network formed by a plurality of computing apparatuses. Optionally, the various modules or steps may be implemented by using program code executable by the computing apparatus, such that they may be stored in a storage apparatus and executed by the computing apparatus, and in some cases, the steps shown or described may be performed in a sequence different from that described herein, or they may be respectively fabricated into various integrated circuit modules, or a plurality of modules or steps thereof may be implemented as a single integrated circuit module. In this way, the embodiments of the present application are not limited to any specific combination of hardware and software.

The foregoing descriptions are merely preferred embodiments of the present application, and are not intended to limit the patent scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A media streaming method, applied to a user equipment, and comprises:
    obtaining a uniform resource identifier for accessing a real-time messaging protocol (RTMP) server;
    determining whether the uniform resource identifier carries a Quick UDP Internet connections (QUIC) identifier;
    establishing a QUIC connection with the RTMP server based on a QUIC transport protocol in response to determining that the uniform resource identifier carries the QUIC identifier; and
    establishing a target RTMP connection with the RTMP server based on the QUIC connection.

2. The media streaming method according to claim 1,
    wherein the QUIC identifier is represented by a Uniform Resource Identifier (URI) scheme in the uniform resource identifier; and
    wherein the URI scheme comprises text "RTMP" and one or more QUIC identification characters following the text "RTMP".

3. The media streaming method according to claim 1,
    wherein the QUIC identifier is a preset string, and the preset string is located in a query string parameter of the uniform resource identifier.

4. The media streaming method according to claim 1, further comprising:
    establishing a TCP connection with the RTMP server based on a TCP transport protocol in response to determining that the uniform resource identifier does not carry the QUIC identifier, and
    establishing another RTMP connection based on the TCP connection.

5. The media streaming method according to claim 1, further comprising:
    in response to determining that the RTMP server does not support establishment of the QUIC connection or the target RTMP connection, converting the uniform resource identifier carrying the QUIC identifier into a uniform resource identifier satisfying a preset format; and
    establishing a connection between the user equipment and the RTMP server in response to the converted uniform resource identifier.

6. The media streaming method according to claim 1, further comprising:
    preconfiguring a QUIC protocol stack and an RTMPQ protocol stack that is based on the QUIC protocol stack;
    wherein the QUIC protocol stack is configured to parse a received QUIC packet, to obtain an RTMP packet, and to provide the RTMP packet to the RTMPQ protocol stack; and
    wherein the RTMPQ protocol stack is configured to parse the RTMP packet provided by the QUIC protocol stack, and to obtain RTMP data to be played.

7. The media streaming method according to claim 6,
    wherein the RTMPQ protocol stack is further configured to encapsulate RTMP data to be sent into an RTMP packet, and to provide the encapsulated RTMP packet to the QUIC protocol stack; and
    wherein the QUIC protocol stack is further configured to encapsulate the RTMP packet provided by the RTMPQ protocol stack into a QUIC packet to be sent.

8. A media streaming method, applied to a server, and comprises:

establishing a Quick UDP Internet connections (QUIC) connection with a user equipment based on a QUIC transport protocol in response to a QUIC connection request provided by the user equipment; and establishing a target real-time messaging protocol (RTMP) connection with the user equipment based on the QUIC connection in response to an RTMP connection request transmitted from the user equipment via the QUIC connection.

9. The media streaming method according to claim 8, further comprising:

preconfiguring a QUIC protocol stack and an RTMPQ protocol stack that is based on the QUIC protocol stack;

wherein the RTMPQ protocol stack is configured to encapsulate RTMP data to be sent into an RTMP packet, and to provide the encapsulated RTMP packet to the QUIC protocol stack; and wherein the QUIC protocol stack is configured to encapsulate the RTMP packet provided by the RTMPQ protocol stack into a QUIC packet to be sent.

10. The media streaming method according to claim 9, wherein the QUIC protocol stack is further configured to parse a received QUIC packet, to obtain an RTMP packet, and provide the RTMP packet to the RTMPQ protocol stack; and wherein the RTMPQ protocol stack is further configured to parse the RTMP packet provided by the QUIC protocol stack, and to obtain RTMP data to be pushed.

11. A computer device, comprising a memory, a processor, and computer-readable instructions stored on the memory and executable by the processor, wherein the computer-readable instructions, when executed by the processor, cause the processor to implement operations comprising:

obtaining a uniform resource identifier for accessing a real-time messaging protocol RTMP) server;

determining whether the uniform resource identifier carries a Quick UDP Internet connections (QUIC) identifier;

establishing a QUIC connection with the RTMP server based on a QUIC transport protocol in response to determining that the uniform resource identifier carries the QUIC identifier; and establishing a target RTMP connection with the RTMP server based on the QUIC connection.

12. The computer device according to claim 11, wherein the QUIC identifier is represented by a Uniform Resource Identifier (URI) scheme in the uniform resource identifier; and wherein the URI scheme comprises text "RTMP" and one or more QUIC identification characters following the text "RTMP".

13. The computer device according to claim 11, wherein the QUIC identifier is a preset string, and the preset string is located in a query string parameter of the uniform resource identifier.

14. The computer device according to claim 11, the operations further comprising:

establishing a TCP connection with the RTMP server based on a TCP transport protocol in response to determining that the uniform resource identifier does not carry the QUIC identifier, and establishing another RTMP connection with the RTMP server based on the TCP connection.

15. The computer device according to claim 11, the operations further comprising:

in response to determining that the RTMP server does not support establishment of the QUIC connection or the target RTMP connection, converting the uniform resource identifier carrying the QUIC identifier into a uniform resource identifier satisfying a preset format; and establishing a connection between the user equipment and the RTMP server in response to the converted uniform resource identifier.

16. The computer device according to claim 11, the operations further comprising:

preconfiguring a QUIC protocol stack and an RTMPQ protocol stack that is based on the QUIC protocol stack;

wherein the QUIC protocol stack is configured to parse a received QUIC packet, to obtain an RTMP packet, and to provide the RTMP packet to the RTMPQ protocol stack; and wherein the RTMPQ protocol stack is configured to parse the RTMP packet provided by the QUIC protocol stack, and to obtain RTMP data to be played.

17. The computer device according to claim 16, wherein the RTMPQ protocol stack is further configured to encapsulate RTMP data to be sent into an RTMP packet, and to provide the encapsulated RTMP packet to the QUIC protocol stack; and wherein the QUIC protocol stack is further configured to encapsulate the RTMP packet provided by the RTMPQ protocol stack into a QUIC packet to be sent.

* * * * *